(12) United States Patent
Chiussi et al.

(10) Patent No.: US 7,099,330 B2
(45) Date of Patent: Aug. 29, 2006

(54) METHOD AND APPARATUS FOR INTEGRATING GUARANTEED-BANDWIDTH AND BEST-EFFORT TRAFFIC IN A PACKET NETWORK

(75) Inventors: Fabio M. Chiussi, Long Branch, NJ (US); Kevin D. Drucker, Annandale, NJ (US); Andrea Francini, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 695 days.

(21) Appl. No.: 10/010,582

(22) Filed: Nov. 13, 2001

(65) Prior Publication Data
US 2003/0142624 A1   Jul. 31, 2003

Related U.S. Application Data

(60) Provisional application No. 60/260,808, filed on Jan. 10, 2001.

(51) Int. Cl.
*H04L 12/56* (2006.01)
*H04L 12/54* (2006.01)
(52) U.S. Cl. .............. 370/395.4; 370/412; 370/429
(58) Field of Classification Search ............... None
See application file for complete search history.

(56) References Cited

U.S. PATENT DOCUMENTS

| | | | | |
|---|---|---|---|---|
| 5,579,302 A | * | 11/1996 | Banks | 370/397 |
| 5,579,312 A | * | 11/1996 | Regache | 370/397 |
| 6,014,367 A | * | 1/2000 | Joffe | 370/230 |
| 6,041,059 A | * | 3/2000 | Joffe et al. | 370/412 |
| 6,493,317 B1 | * | 12/2002 | Ma | 370/237 |
| 6,529,520 B1 | * | 3/2003 | Lee et al. | 370/442 |
| 6,680,933 B1 | * | 1/2004 | Cheesman et al. | 370/352 |
| 2002/0097675 A1 | * | 7/2002 | Fowler et al. | 370/230 |
| 2002/0136230 A1 | * | 9/2002 | Dell et al. | 370/416 |
| 2004/0076161 A1 | * | 4/2004 | Lavian et al. | 370/395.41 |

FOREIGN PATENT DOCUMENTS

JP     2002101124 A    *  4/2002

* cited by examiner

*Primary Examiner*—Huy D. Vu
*Assistant Examiner*—Clemence Han

(57) ABSTRACT

A scheduling apparatus flexibly integrates guaranteed-bandwidth (GB) and best-effort (BE) flows and comprises a combination of a primary weighted-round-robin (WRR) scheduler (PWS) and a secondary WRR scheduler (SWS). The PWS distributes service to the individual GB flows and determines the amount of service that the BE flow aggregate should receive during each frame. The SWS takes care of fairly distributing the service share of the BE aggregate over the individual BE flows. The scheduling apparatus divides the service frame in two subframes. In the first subframe, the PWS fulfills the bandwidth requirements of the GB flows. In the second subframe, the SWS distributes fair service to the BE flows. For each frame, the duration depends on the amount of bandwidth allocated to the GB flows and on the number of GB flows that are backlogged at the beginning of the frame. The amount of bandwidth globally available to BE flows (i.e., the duration of the second subframe) is dynamically adapted to the backlog state of the GB flows, increasing when the GB-flow activity is low, and decreasing when the GB-flow activity intensifies.

21 Claims, 12 Drawing Sheets

FIG. 3A

```
1    if (flow i is newly backlogged)
2        $F_i^k \leftarrow \frac{l_i^k}{\rho_i}$
3        Append i to the tail of the linked list
4    else  /* A packet of i has just been transmitted */
5        $F_i^k \leftarrow F_i^{k-1} + \frac{l_i^k}{\rho_i}$
6        if $(F_i^k \geq T_Q)$
7            $F_i^k \leftarrow F_i^k - T_Q$
8            Conclude visit to flow i
9        else
10           Keep servicing flow i
```

FIG. 3B

```
1    $F_i^k \leftarrow F_i^{k-1} + \frac{l_i^k}{\rho_i}$
2    if $(F_i^k \geq T_Q)$
3        $F_i^k \leftarrow F_i^k - T_Q$
4        Conclude visit to flow i
5    else if (flow i is still backlogged)
6        Keep servicing flow i
```

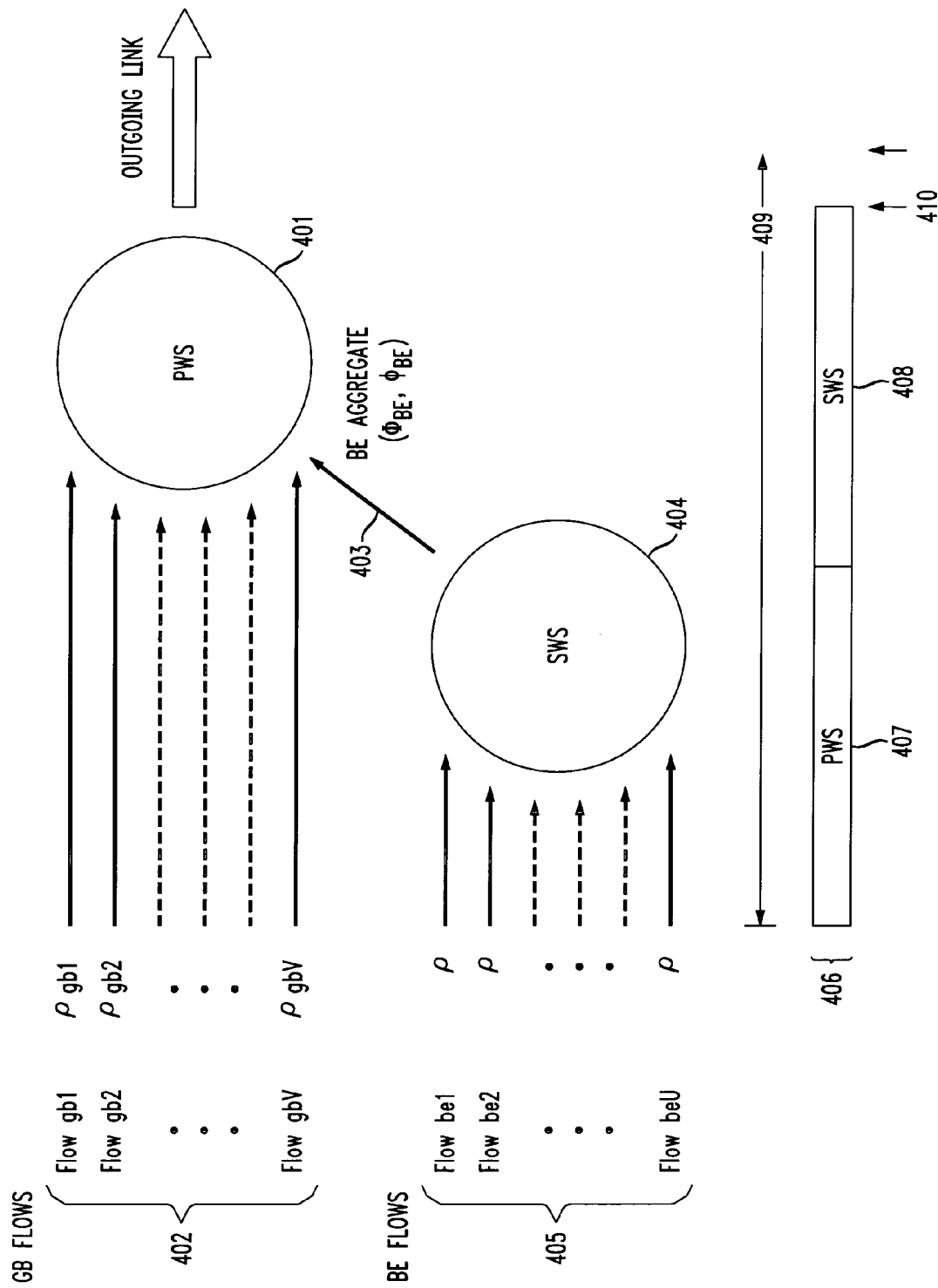

FIG. 7

| FIG. 7A |
|---|
| FIG. 7B |
| FIG. 7C |
| FIG. 7D |
| FIG. 7E |

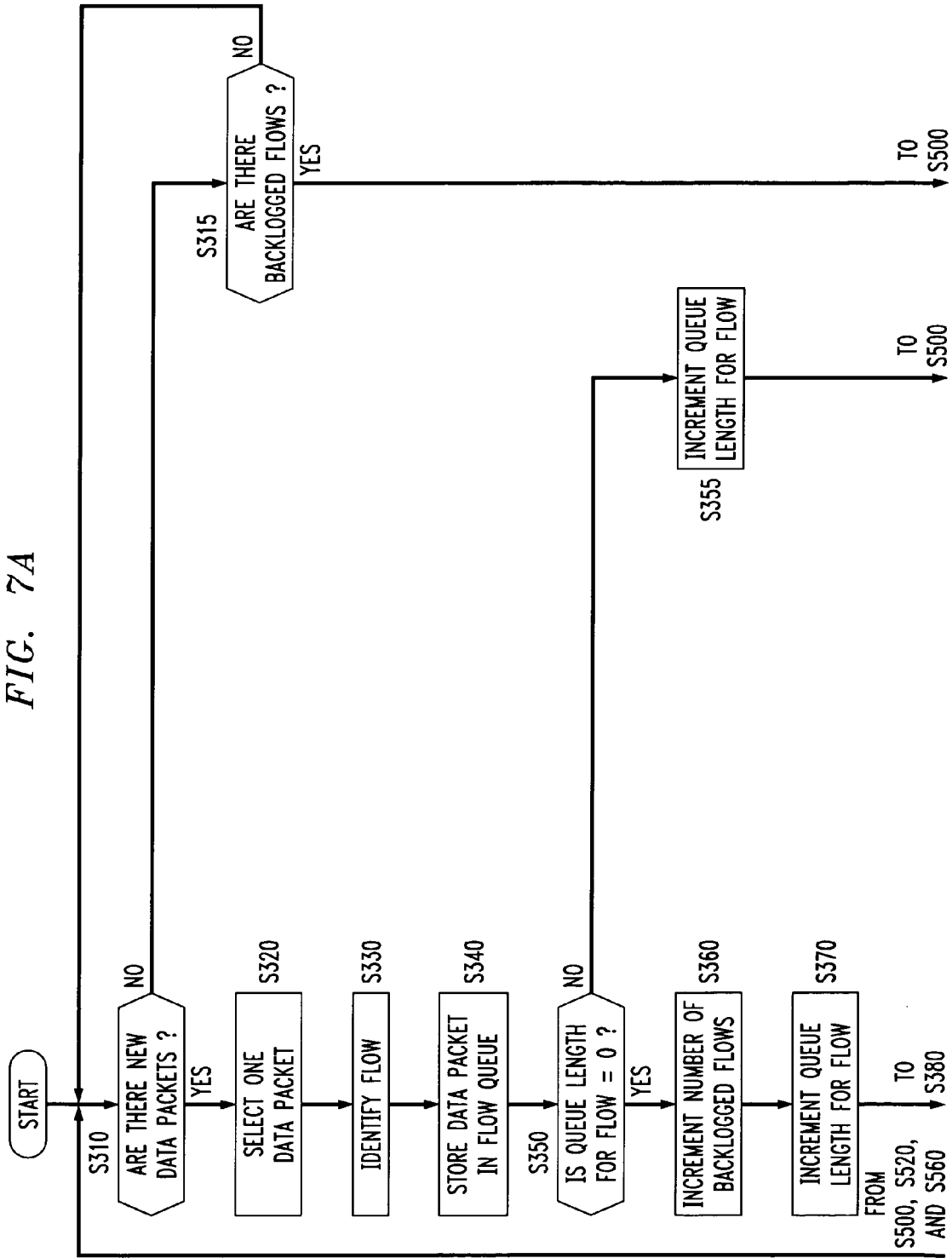

METHOD AND APPARATUS FOR INTEGRATING GUARANTEED-BANDWIDTH AND BEST-EFFORT TRAFFIC IN A PACKET NETWORK

RELATED APPLICATION

This application is based on a provisional application, Ser. No. 60/260,808, filed on Jan. 10, 2001, and entitled "Method and Apparatus for Integrating Guaranteed-Bandwidth and Best-Effort Traffic in a Packet Network."

TECHNICAL FIELD OF THE INVENTION

This invention relates to packet schedulers, and more particularly to a packet-scheduling apparatus and method for simultaneously guaranteeing data transfer rates to data sources with bandwidth requirements and fairness to data sources with no bandwidth requirements.

BACKGROUND OF THE INVENTION

The increasing popularity of elaborate Quality-of-Service (QoS) frameworks such as Integrated Services and Differentiated Services puts emphasis on packet schedulers that allow flexible bandwidth management. Because of the heavy implementation cost of packet schedulers that feature optimal delay performance and because worst-case delay performance is actually rather secondary to robust bandwidth performance in IP networks, the industry is showing strong interest in Weighted Round Robin (WRR) schedulers [see references 1, 2, 3 listed in the attached Appendix], which have very low complexity and can provide robust bandwidth guarantees and fairness, but do not necessarily achieve tight delay bounds. A WRR scheduler can provide strict bandwidth guarantees to guaranteed-bandwidth (GB) flows (i.e., flows with specified bandwidth requirements) and service fairness to best-effort flows (i.e., flows with no specified bandwidth requirements) when it handles flows of either type in isolation (i.e., without flows of the other type). Typically, the aggregation of GB and BE flows in a single WRR scheduler compromises the efficiency of the server in allocating bandwidth resources. In existing WRR schedulers, a BE flow can be serviced only if it is allocated a service share. The selection of the service share is always arbitrary, and intrinsically compromises the flexibility that should instead characterize the distribution of bandwidth to BE flows. Furthermore, the service shares allocated to the BE flows are subtracted from a bandwidth pool that is shared with the GB flows, which implies a reduction in the amount of GB flows that the scheduler can support.

What is desired is an improved WRR scheduler that can efficiently integrate GB and BE flows.

SUMMARY OF THE INVENTION

In accordance with the present invention, a scheduling method and apparatus is disclosed which flexibly integrates guaranteed-bandwidth (GB) and best-effort (BE) flows. The packet-scheduling apparatus comprises a combination of a primary WRR scheduler (PWS) and a secondary WRR scheduler (SWS). The PWS divides the activity of the server into service frames. Within each service frame, the PWS distributes service to the individual GB flows and determines the amount of service that the aggregate of all backlogged BE flows should receive. The SWS takes care of fairly distributing the service share of the BE aggregate over the individual BE flows.

The operation of the packet-scheduling apparatus divides the service frame in two subframes. In the first subframe, the PWS fulfills the bandwidth requirements of the GB flows. In the second subframe, the SWS distributes fair service to the BE flows. For each frame, the duration of the two subframes depends on the amount of bandwidth allocated to the GB flows and on the number of GB flows that are backlogged at the beginning of the frame. The duration of the second subframe reflects the amount of bandwidth that is available to the BE flows within a service frame. It changes with the backlog state of the GB flows: it increases when the activity of the GB flows is low, and decreases when the activity of the GB flows intensifies. Thus, in the scheduler of the present invention, the service shares of the BE flows are no longer drawn from the same finite pool (constrained by the capacity of the server) that also sustains the bandwidth guarantees of the GB flows, but from a distinct, unconstrained pool that dynamically adapts to the portion of server capacity left unused by the GB flows.

More particularly in accordance with the present invention, we describe a scheduling apparatus for servicing data packet flows in service frames. The scheduling apparatus comprises (1) a first scheduler for providing bandwidth guarantees to a first set of GB flows during a first subframe of a service frame, the duration of the first subframe being adjusted to satisfy the bandwidth requirements of the GB flows, and (2) a second scheduler for providing service to a second set of BE flows during a second subframe of the service frame, the BE flows having service requirements that are not expressed in terms of guaranteed bandwidth requirements, the duration of the second subframe being the duration of the service frame minus the duration of the first subframe in the same service frame. Notice that, according to another aspect of the invention, the second scheduler need not be necessarily arranged to equally distribute service to each of the individual BE flows.

We also describe a method of operating a scheduler for servicing data packets of GB flows and BE flows in service frames, comprising the steps of: (1) providing service to a first set of GB flows during a first subframe of a service frame, said GB data packet flows having service requirements expressed in terms of bandwidth requirements, the duration of the first subframe being adjusted to satisfy the bandwidth requirements of said GB data packet flows, and (2) providing service to a second set of BE flows during a second subframe of the service frame, said BE data packet flows having service requirements that are not expressed in terms of guaranteed bandwidth requirements, the duration of the second subframe being the duration of the service frame minus the duration of the first subframe in the same service frame.

BRIEF DESCRIPTION OF THE DRAWINGS

In the drawings,

FIG. 3A shows an example of pseudo-code used in a Deficit Round Robin (DRR) algorithm to handle flow i when a new packet arrives at the head of a flow queue.

FIG. 3B shows an example of pseudo-code used in a Surplus Round Robin (SRR) algorithm to update a timestamp i when the server completes the transmission of a packet.

FIG. 4 shows, in accordance with the present invention, a diagram illustrating the two-layered logical organization of the scheduler.

FIGS. 7 and 7A–7E show an illustrative flowchart describing a method of scheduling the transmission of packets in accordance with the present invention.

In the following description, identical element designations in different figures represent identical elements. Additionally in the element designations, the first digit refers to the figure in which that element is first shown (e.g., element 102 is first shown in FIG. 1).

DETAILED DESCRIPTION

Figure 1:
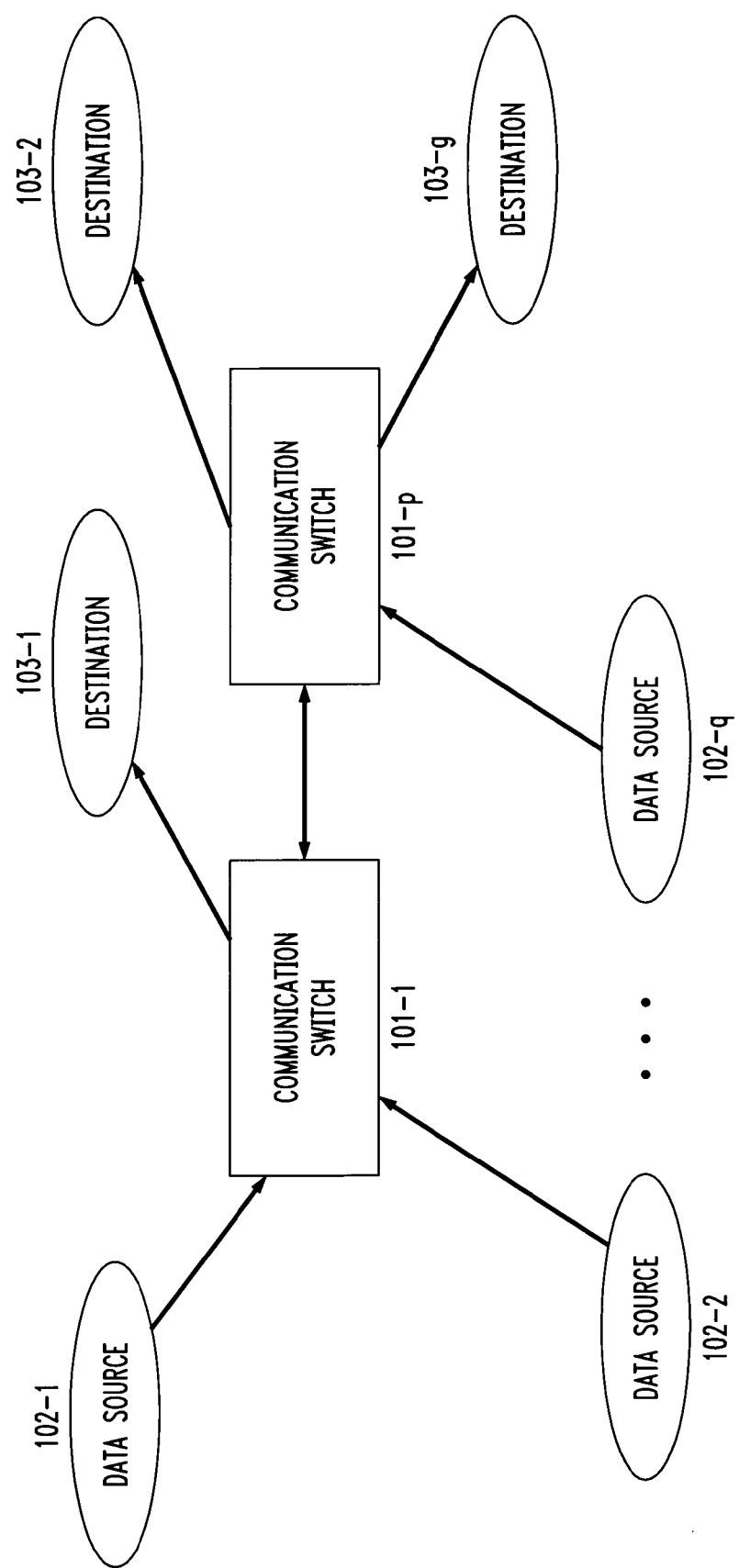
FIG. 1 shows an illustrative packet network including data sources, communication switches, and data destinations.

FIG. 1 shows an illustrative packet network in which a plurality of switches 101-1 through 101-p are connected to each other by communication links. A number of data sources 102-1 through 102-q are connected to the communication switches. A network connection is established from each of the data sources to a corresponding destination 103-1 through 103-g, and data packets are transmitted from each data source to the corresponding destinations.

Figure 2:
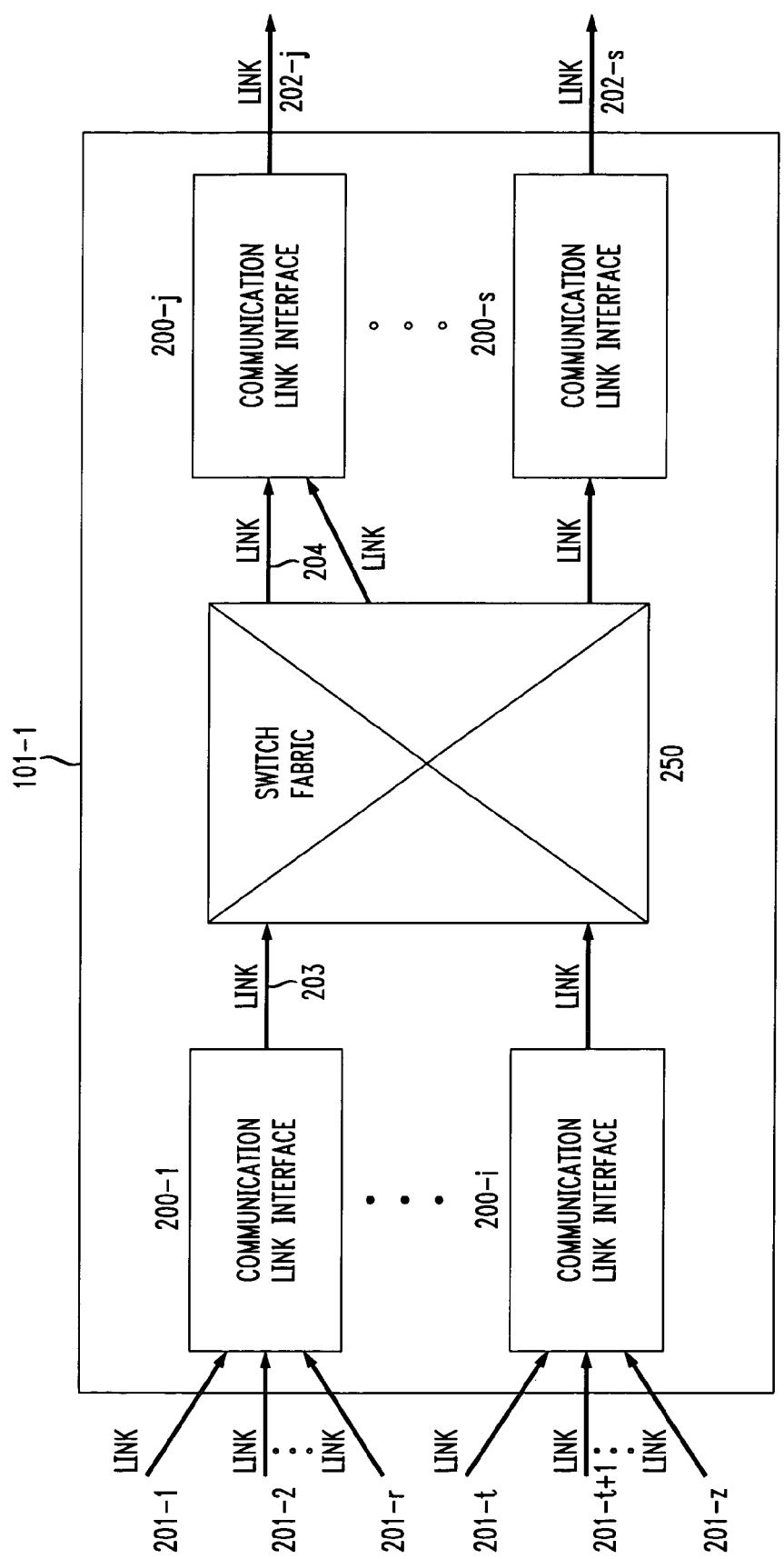
FIG. 2 shows an illustrative communication switch used in the packet network of FIG. 1.

FIG. 2 shows an illustrative block diagram of the communication switch 101-1 of the packet network. As shown, the communication switch includes a switch fabric 250 and a plurality of communication link interfaces 200-1 through 200-s. Each of the communication link interfaces connects a plurality of input links to an output link and transfers data packets from the input links to the output link. The communication switch 101-1 may contain just one or a plurality of such communication link interfaces 200. For example, input communication link interface 200-1 is located in front of the switch fabric 250, in which case its input links 201-1 through 201-r are input links of the communication switch 101-1, and its output link 203 connects to the switch fabric 250. As a second example, output communication link interface 200-j is located at the output of the switch fabric 250, where its input links may be a plurality of output links 204 of the switch fabric 250, and its output link is an output link 202-j of the communication switch 101-1. It should be noticed that packets received over a particular link or over different links may or may not have the same length. For example, if the switch fabric 250 is an Asynchronous Transfer Mode (ATM) switch and the network of FIG. 1 is an ATM network, then all packets have the same length. In the following description of the invention, we assume that packets received over a particular link or over different links have not necessarily the same length.

As will be discussed in a later paragraph with reference to FIG. 6, each of the communication link interfaces 200 of FIG. 2 typically includes at least a packet receiver, a scheduler, and a packet transmitter. As stated above, the scheduler may be a Weighted Round Robin (WRR) scheduler [1,2,3], which in turn may be implemented according to a Deficit Round Robin (DRR) [2] or a Surplus Round Robin (SRR) [3] algorithm.

The Deficit Round Robin (DRR) algorithm is one of the most popular instantiations of a WRR scheduler for variable-sized packets, due to its minimal implementation complexity and its efficiency in servicing the flows in proportion to their allocated service shares. The DRR algorithm also divides the activity of the server into service frames. Conforming to the WRR paradigm, the DRR algorithm associates a service share $\rho_i$ with each configured flow i. The service shares translate into minimum guaranteed service rates when their sum over all configured flows does not exceed the capacity r of the server:

$$\sum_{i=1}^{V} \rho_i \qquad (1)$$

The bound of eq. (1), where V is the total number of configured flows, guarantees that flow i receives service at a long-term rate that is not lower than $p_i$.

The DRR algorithm divides the activity of the server into service frames. The present invention refers to a formulation of the algorithm that uses a reference timestamp increment $T_Q$ to express the frame duration in a virtual-time domain. This formulation is functionally equivalent to the definition of DRR originally presented in [2], but is better suited to the description of the invention.

Within a frame, each configured flow i is entitled to the transmission of a quantum $Q_i$ of information units such that $$Q_i = \rho_i \cdot T_Q \qquad (2)$$

The scheduler visits the backlogged flows only once per frame, and therefore fulfills in a single shot their service expectations for the frame. Each flow i maintains a queue of packets (flow queue), and a timestamp $F_i$ that is updated every time a new packet $p_i^k$ of length $l_i^k$ reaches the head of the flow queue:

$$F_i^k = F_i^{k-1} + \frac{l_i^k}{\rho_i} \qquad (3)$$

The scheduler keeps servicing the flow as long as its timestamp remains smaller than $T_Q$. When the timestamp $F_i$ exceeds the reference timestamp increment $T_Q$, the scheduler declares the visit to flow i over, subtracts $T_Q$ from the timestamp of flow i, and looks for another backlogged flow to serve. As a result, after subtraction of $T_Q$, the value of $F_i$ expresses a service credit for flow i. In general, the timestamps carry over the service credits of the backlogged flows to the following frames, allowing the scheduler to distribute service proportionally to the allocated service shares in the long term (i.e., over multiple frames).

When a flow i becomes idle, the scheduler immediately moves to another flow to start giving it service. If flow i becomes backlogged again in a short time, it must wait for the next frame to start in order to receive a new visit from the server. When the flow becomes idle, its timestamp is reset to zero to avoid any loss of service when the same flow becomes backlogged again in a future frame. By construction, the timestamp of an idling flow is always smaller than $T_Q$, so that the timestamp reset never generates extra service credits that would otherwise penalize other flows.

By construction, at the beginning of a service frame the value of timestamp $F_i$ of flow i ranges between 0 and $L_i/\rho_i$, where $L_i$ is the maximum size of a packet of flow i. The fluctuation of the initial value of the timestamp induces the fluctuation of the amount of information units that flow i transmits in a frame, which ranges within the interval $(Q_i-L_i, Q_i+L_i)$. Accordingly, the total amount of information units that the server transmits in a frame is not fixed, even when all configured flows are permanently backlogged.

The DRR scheduler was implemented in [2] with a single linked list of backlogged flows, visited in FIFO order. The arrangement of the backlogged flows in a single FIFO queue leads to O(1) implementation complexity, provided that the reference timestamp increment $T_Q$ is not smaller than the timestamp increment determined by the maximum-sized packet for the flow with minimum service share:

$$T_Q \geq \frac{L_{ma}}{\rho_{mi}} \quad (4)$$

If the condition of eq. (4) is not satisfied, the algorithmic complexity of the scheduler explodes with the worst-case number of elementary operations to be executed between consecutive packet transmissions (elementary operations include: flow extraction and insertion in the linked list; timestamp update; comparison of the timestamp with the reference timestamp increment). In fact, the scheduler may have to deny service to the flow for several consecutive frames, until the repeated subtraction of the reference timestamp increment makes the timestamp fall within the $[0,T_Q)$ interval. Shown in FIG. 3A is an illustrative listing of pseudo-code that specifies the rules for handling flow i and updating its timestamp in DRR when a new packet reaches the head of its queue.

A description of Surplus Round Robin (SRR) is provided in [3]. The algorithm features the same parameters and variables as DRR, but a different event triggers the update of the timestamp: a flow i receives a new timestamp $F_i^k$ when the transmission of packet $p_i^k$ gets completed, independently of the resulting backlog state of the flow. The end of the frame is always detected after the transmission of a packet, and never before: the timestamp carries over to the next frame the debit accumulated by the flow during the current frame, instead of the credit that is typical of DRR.

An advantage of SRR over DRR is that it does not require knowing in advance the length of the head-of-the-queue packet to determine the end of the frame for a flow. Conversely, in order to prevent malicious flows from stealing bandwidth from their competitors, the algorithm cannot reset the timestamp of a flow that becomes idle. The non-null timestamp of an idle flow is eventually obsoleted by the end of the same frame in which the flow becomes idle. Ideally, the timestamp should be reset as soon as it becomes obsolete. However, in a scheduler that handles hundreds of thousands or even millions of flows, a prompt reset of all timestamps that can simultaneously become obsolete is practically impossible. The present description of the invention focuses on implementations of the SRR algorithm that do not perform any check for obsolescence on the timestamps of the idle flows, and where a newly backlogged flow always resumes its activity with the latest value of the timestamp, however old that value can be. The effect of this assumption is that a newly backlogged flow may have to give up part of its due service the first time it is visited by the server, in consequence of a debit accumulated long time before. Shown in FIG. 3B is an illustrative listing of pseudo-code that specifies the rules for handling flow i and updating its timestamp in SRR when the server completes the transmission of packet $p_i^k$.

For simplicity of presentation, in the rest of this document the Weighted Round Robin (WRR) name will be used to allude to DRR or SRR generically, with no explicit reference to their distinguishing features.

The availability of low-cost traffic-management techniques for providing bandwidth guarantees to end-to-end flows or aggregates of those flows and the existence of robust frameworks for supporting service guarantees network-wide [4, 5, 6, 7] are not sufficient reasons to imply the removal of best-effort traffic from IP networks [4], and instead introduce additional traffic-management issues to be solved at the network nodes to efficiently integrate different types of traffic. Best-effort flows have no explicitly specified QoS requirements; accordingly, no bandwidth resources should be reserved for these flows in the scheduler that regulates access to an outgoing link. However, fairness in the relative treatment of distinct BE flows insisting on the same link may be highly desirable.

When considering a set of best-effort flows in isolation, a WRR scheduler with identical service-share allocation for all flows is the simplest scheme that can be conceived to meet the fairness objective. If guaranteed-bandwidth flows also contend for the same outgoing link, a single WRR scheduler is no longer adequate: the shares allocated to BE flows subtract bandwidth from the pool that can be allocated to GB flows and enforce fixed proportions in the distribution of bandwidth that contradict the nature of BE flows.

A simple example illustrates the problem. A single WRR scheduler handles both GB and BE flows. The server allocates 1% of its capacity r to each configured BE flow (of course, the choice of 1% is totally arbitrary, as is the case for any other value). The activity of the scheduler starts with 20 configured BE flows. At this point, each BE flow obtains 5% of the server capacity if all the BE flows remain permanently backlogged. Then, the server accepts two GB flows, each asking for 0.4 r. The capacity of the server is now totally allocated, and no additional flows of either type can be setup.

A consequence of allocating an explicit share to best-effort flows is that the presence of such flows reduces the amount of nominal bandwidth that the server can reserve for GB flows. Moreover, the availability of nominal bandwidth constrains the number of configurable BE flows. Ideally, the GB flows should have access to the whole capacity of the server, and the configuration of BE flows should not be constrained by the availability of nominal bandwidth (simply because the BE flows have no explicit bandwidth requirements).

In the example, whenever one of the two configured GB flows becomes idle, the single WRR scheduler grants 0.66 r to the GB flow that remains backlogged, while each BE flow gets 1.66% of the capacity of the server (the scheduler keeps servicing the backlogged flows in fixed proportions, according to their explicit shares). Ideally, the backlogged GB flow should instead receive no more than 40% of the capacity of the server, while each BE flow should be serviced at 0.03 r.

A Fair Airport scheduler [8] where the BE flows have no reserved bandwidth in the Guaranteed Service Queue (GSQ) and higher priority than GB flows in the Auxiliary Service Queue (ASQ) would provide an elegant solution to all the functional issues involved in the integration of GB and BE flows, but also induce an implementation cost for the scheduler that is far above the typical cost of a WRR scheduler. A much cheaper option can be found in [9, 10]: the server handles GB and BE flows in two distinct WRR schedulers, and serves the BE aggregate only after having granted to the GB aggregate the sum of the guaranteed service shares of the allocated GB flows. Unfortunately, this approach lacks flexibility in passing to BE flows the bandwidth that is not used by idle GB flows, because no bandwidth is transferred from the GB aggregate to the BE aggregate as long as at least one GB flow remains backlogged. Thus, no prior WRR scheduler provides efficient integration of GB and BE flows.

The problems of the prior art are solved, in accordance with the present invention, using a single WRR scheduling engine that flexibly integrates guaranteed-bandwidth (GB) and best-effort (BE) flows. FIG. 4 shows the two-layered logical organization of the enhanced WRR scheduler.

The WRR scheduler of the present invention comprises a combination of two WRR schedulers. The primary WRR scheduler (PWS) 401 distributes service to the individual GB flows 402 and determines the amount of service that the BE flow aggregate 403 should receive during each frame. The secondary WRR scheduler (SWS) 404 takes care of fairly distributing the service share of the BE flow aggregate over the individual BE flows 405.

Figure 5:
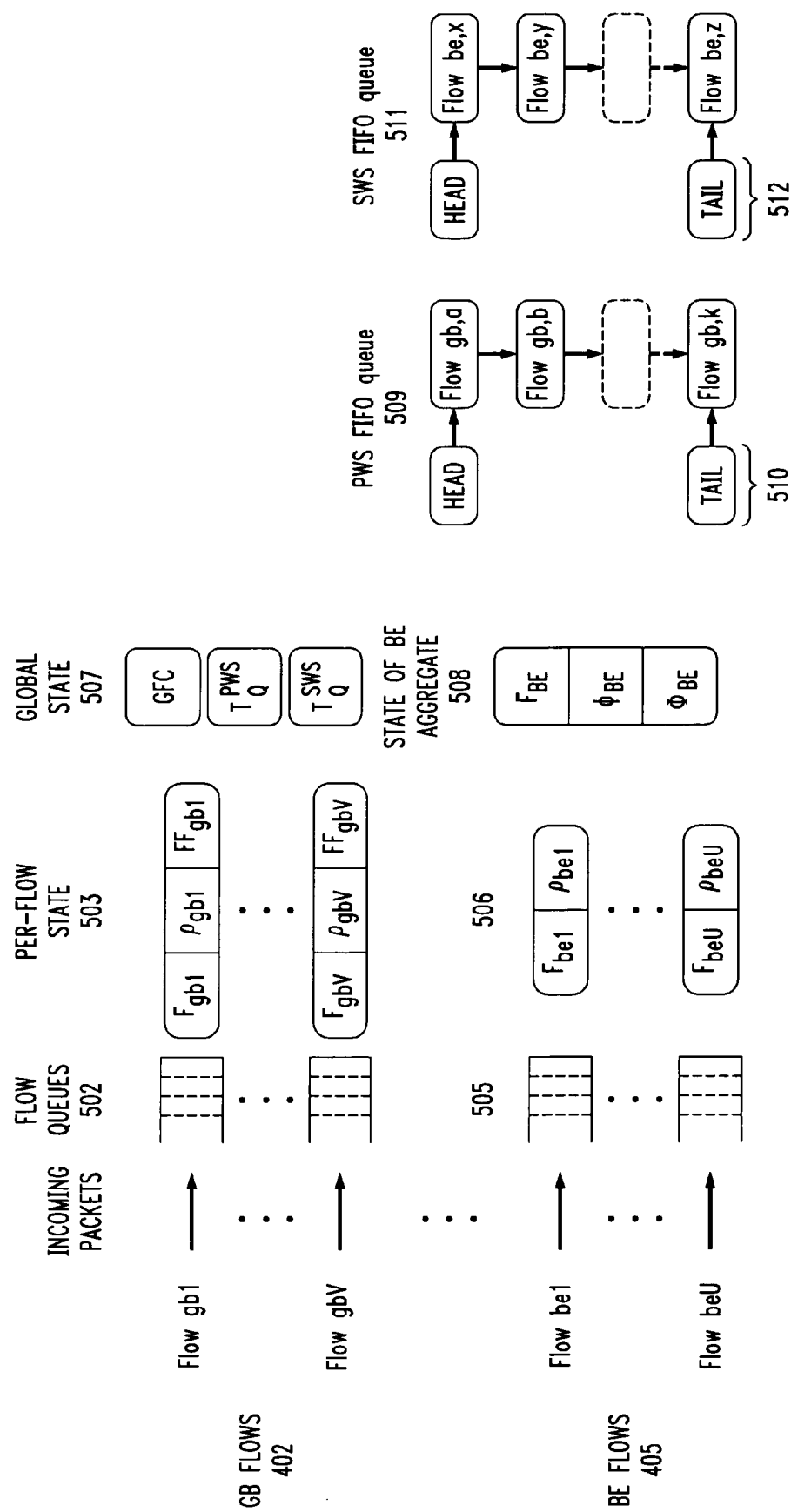
FIG. 5 shows a functional diagram of the queues, state tables, registers, and parameters utilized by the scheduler of the present invention.

The WRR scheduler of the present invention achieves the finest granularity in transferring unused bandwidth from GB to BE flows, at the only cost of replicating the queueing structure of the basic WRR scheduler and maintaining some state information for the BE aggregate (FIG. 5). The WRR scheduler modifies the operation of a basic WRR scheduler by dividing the service frame 406 in two subframes. In the first subframe 407, the PWS 401 fulfills the bandwidth requirements of the GB flows 402. In the second subframe 408, the PWS 401 distributes fair service to the plurality of BE flows 405. The expected duration 409 of each frame 406 is fixed and formally expressed by the PWS reference timestamp increment $T_Q^{PWS}$. The actual frame duration 410 mostly depends on the availability of backlogged BE flows throughout the frame.

As opposed to the WRR schedulers of the prior art, in the enhanced WRR scheduler of the present invention the service shares of the BE flows are no longer drawn from the same finite pool (constrained by the capacity of the server) that also sustains the bandwidth guarantees of the GB flows, but from a distinct, unconstrained pool that dynamically adapts to the portion of server capacity left unused by the GB flows. The scheduling apparatus handles the individual GB flows 402 and the BE flow aggregate 403 (treated as a single entity) in the PWS 401. In the PWS 401, the service share of the BE flow aggregate 403 is not fixed, and instead adapts to the backlog dynamics of the GB flows at every service frame. The SWS 404, functionally identical to the PWS 401, guarantees fair (equal) distribution of service to the individual BE flows 405 by assigning the same value of service share to all flows. In this manner, the WRR scheduler flexibly integrates guaranteed-bandwidth and best-effort flows. Notice that, according to another aspect of the invention, the second scheduler need not be necessarily arranged to equally distribute service among the BE flows.

Before describing the detailed operation of the scheduler, we focus on its functional elements. FIG. 5 illustrates the queues, state tables, registers, and parameters utilized by the enhanced WRR scheduler for flexibly integrating GB and BE flows. The GB flows 402 are shown as gb1-gbV. For each GB flow 402, the received packets are stored in respective ones of the flow queues 502. The per-flow GB state tables 503 store various data elements for the GB flows, and there is one of them for each GB flow 402. Considering for example flow gb1, GB state table 503 includes a timestamp $F_{gb1}$, a minimum guaranteed service share $\rho_{gb1}$, and a frame flag $FF_{gb1}$.

The individual BE flows 405 are shown as be1-beU. For each BE flow 405, the received packets are stored in respective ones of the flow queues 505. The per-flow BE state tables 506 store various data elements for the BE flows, and there is one of them for each BE flow 405. Considering for example flow be1, data table 506 includes a timestamp $F_{be1}$ and a service share $\rho_{be1}$. As previously mentioned, the service shares $\rho_{be1}$-$\rho_{beU}$ need not be the same for all BE flows be1-beU.

The global state table 507 stores data such as a global frame counter GFC, a reference timestamp increment $T_Q^{PWS}$ for the PWS, and a reference timestamp increment $T_Q^{SWS}$ for the SWS. The BE flow-aggregate state table 508 stores data that pertain to the BE flow aggregate, such as a timestamp $F_{BE}$, a BE running share $\phi_{BE}$, and a BE cumulative share $\Phi_{BE}$. A PWS First-In-First-Out (FIFO) queue 509 stores pointers to the GB flows 402. The PWS FIFO queue 509 indicates the order by which the PWS has to visit the GB flows to determine the transmission of their packets out of the respective GB flow queues 502. The registers 510 store pointers to the head and tail positions in the PWS FIFO queue 509. An SWS FIFO queue 511 stores pointers to the BE flows 405. The SWS FIFO queue 511 indicates the order by which the SWS has to visit the BE flows to determine the transmission of their packets out of the respective BE flow queues 505. The registers 512 store pointers to the head and tail positions in the SWS FIFO queue 511.

Figure 6:
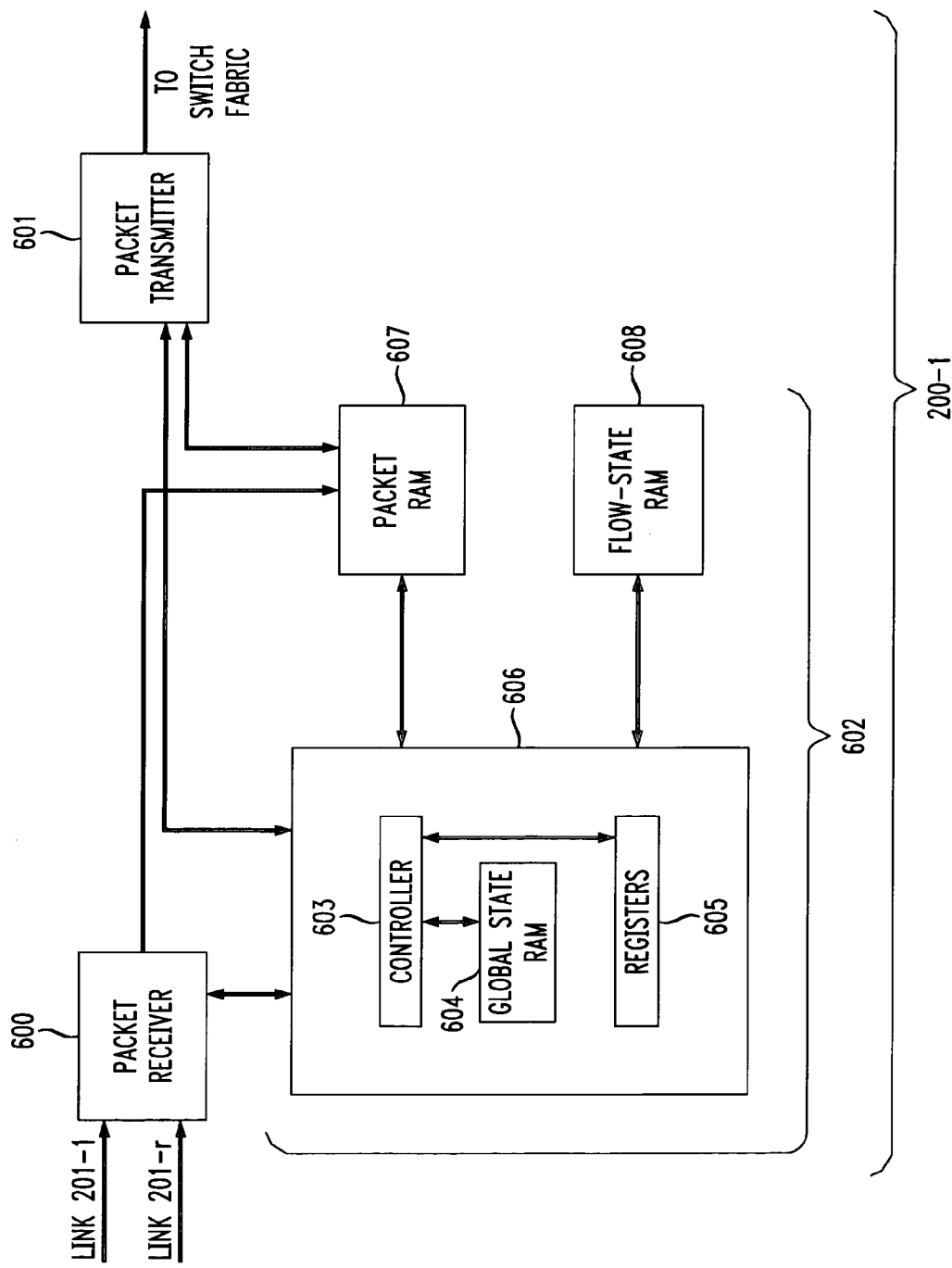
FIG. 6 shows an illustrative block diagram of a particular implementation of the apparatus of FIG. 5.
Figure 7B:
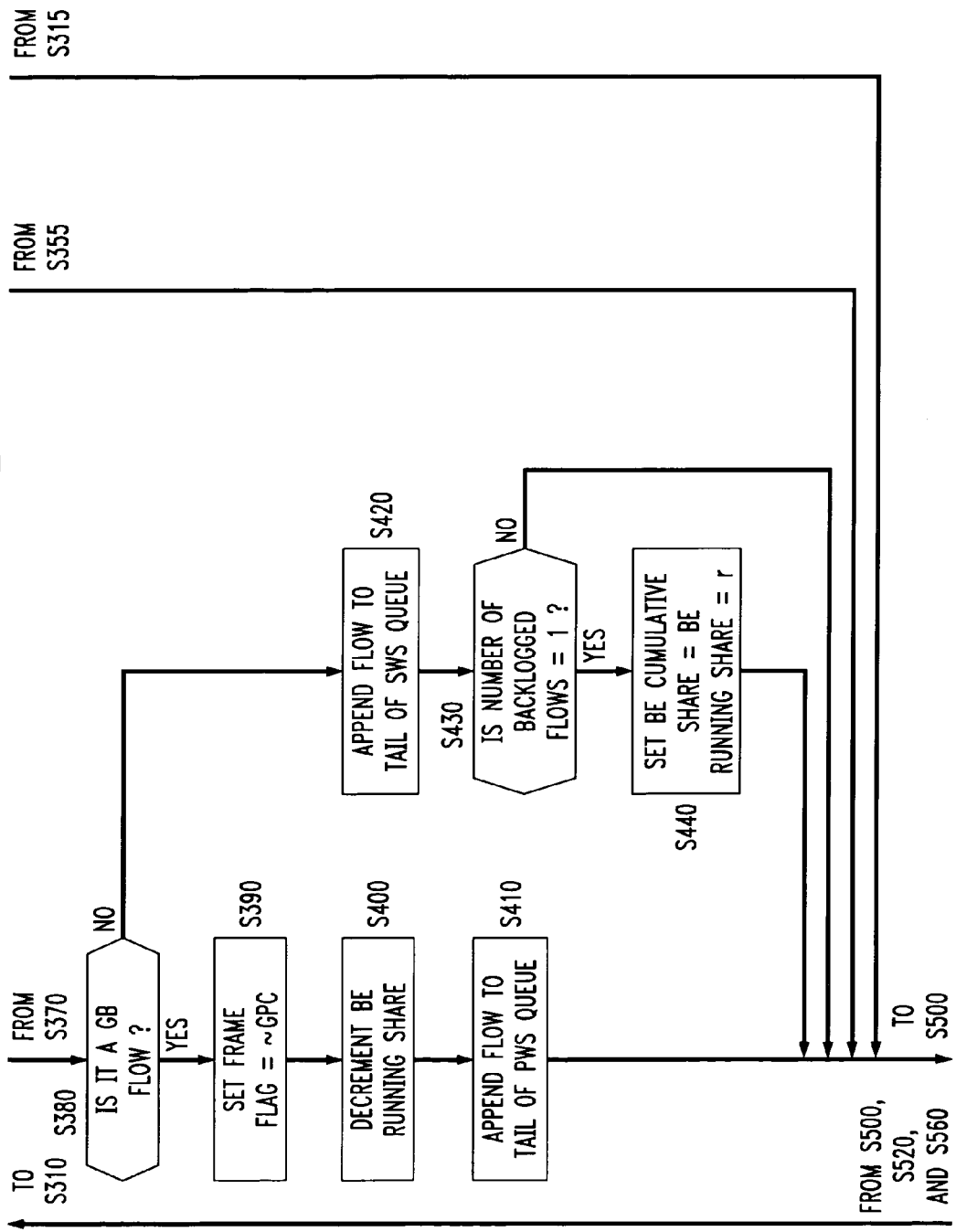
Figure 7C:
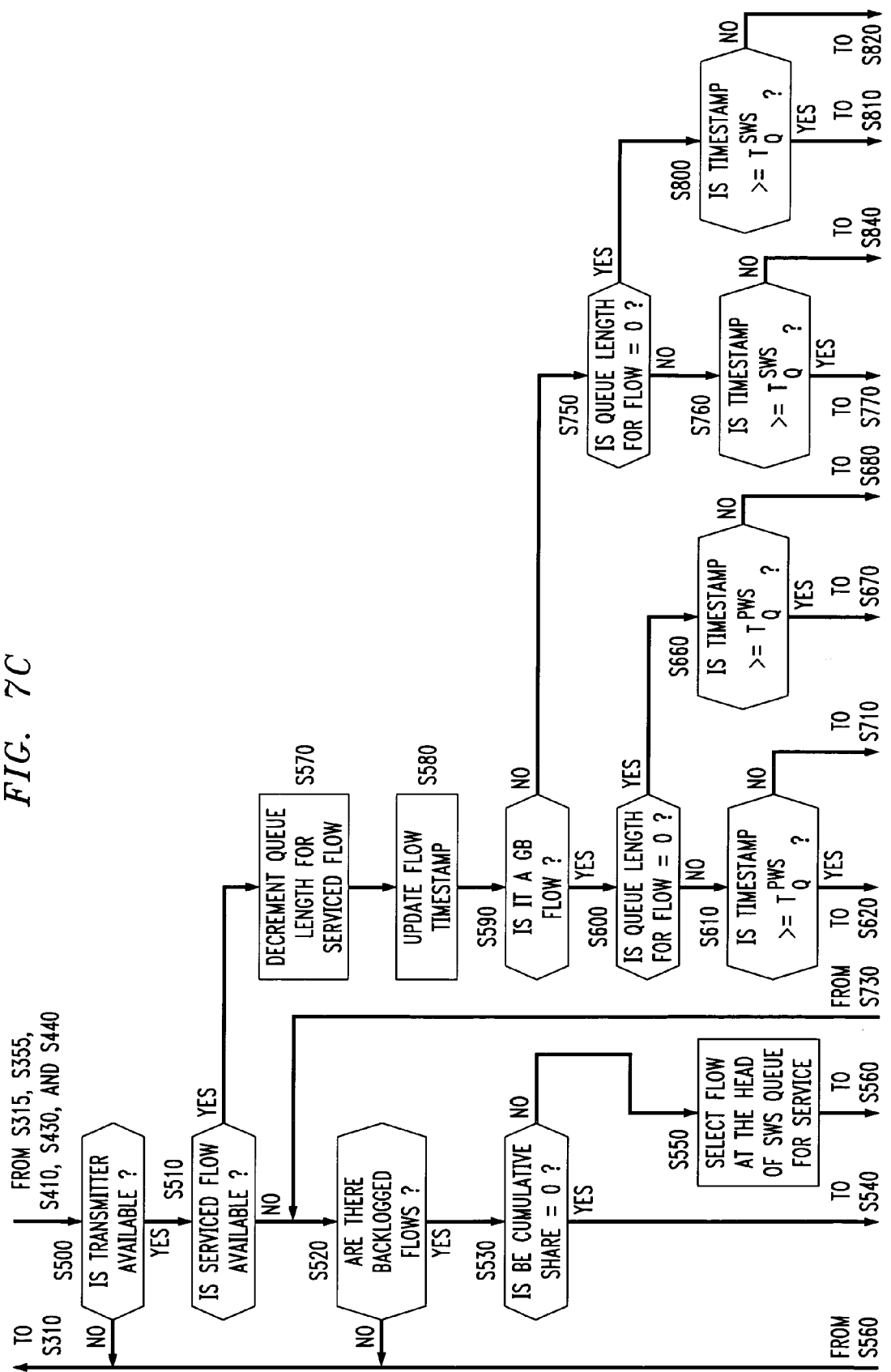
Figure 7D:
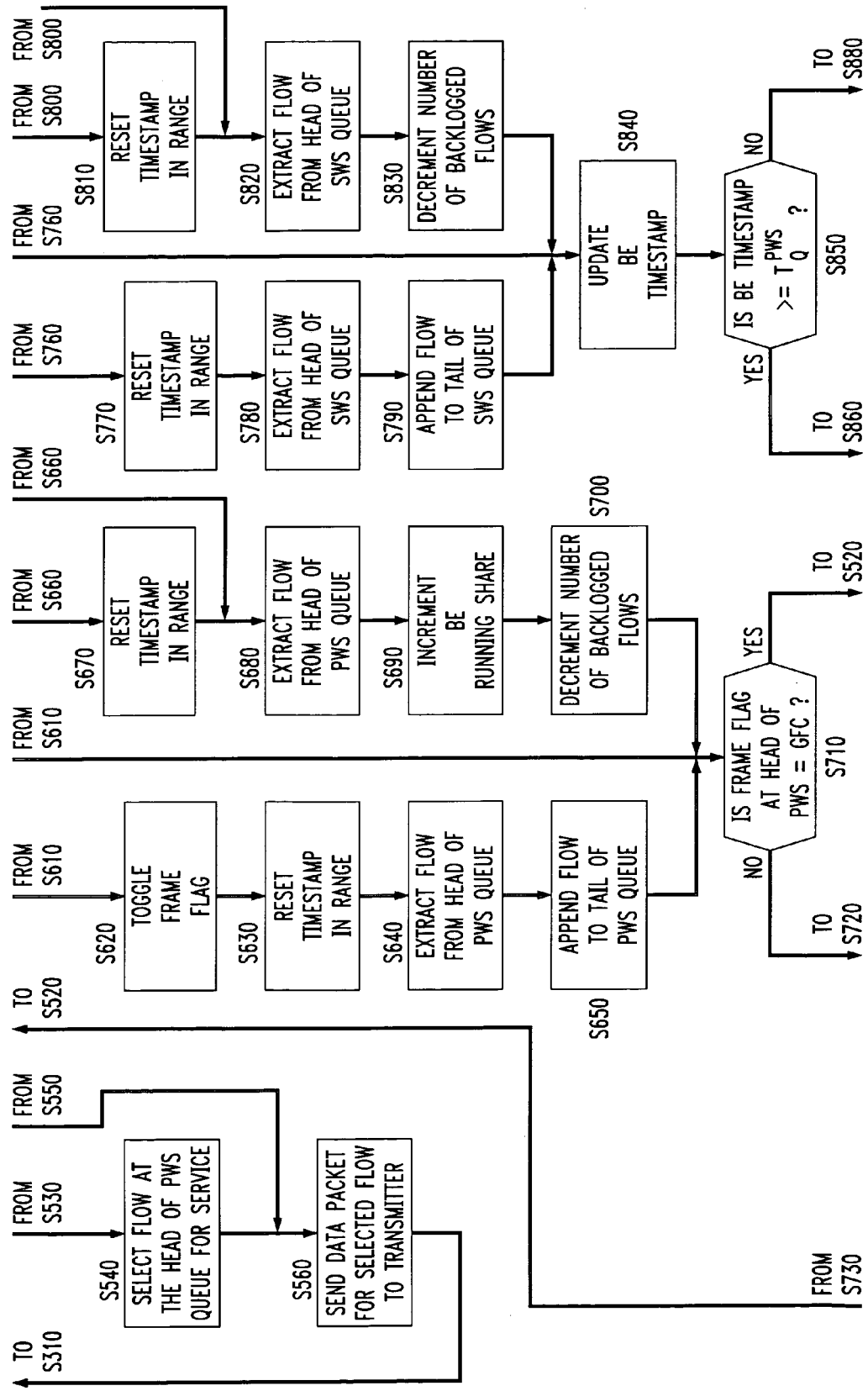
Figure 7E:
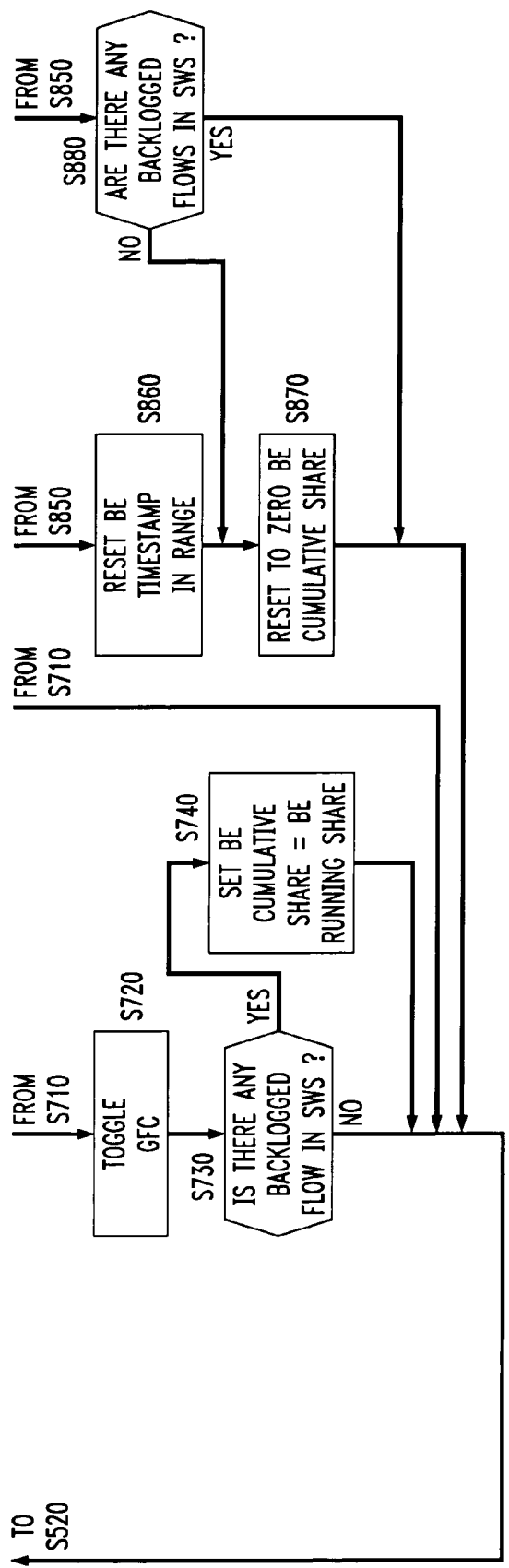

FIG. 6 shows an illustrative block diagram of an input communication link interface 200 in which the scheduler may be utilized. The communication link interface 200 includes a data packet receiver 600, a scheduler 602, and a packet transmitter 601. Illustratively, the scheduler is shown to include a controller 603, a global state RAM 604, and registers 605, all on the same chip 606. A packet RAM 607 and a per-flow state RAM 608 are shown located on separate chips. Obviously, depending on the operating capacity and other characteristics, the scheduler 602 may be implemented in other configurations.

The controller 603 stores and runs the program that implements the method of the present invention. An illustrative example of the program that controls the operation of the communication link interface 200 is shown in flowchart form in FIGS. 7A–E. With joint reference to FIGS. 5 and 6, the packets in the GB and BE flow queues 502 and 505 are stored in packet RAM 607; the GB per-flow state tables 503 and the BE per-flow state tables 506 are stored in RAM 608; the global state table 507 and the BE aggregate state table 508 are stored in RAM 604; the elements in the PWS and SWS FIFO queues 509 and 511 are stored in RAM 608; the head and tail pointers 510 and 512 of the PWS and SWS FIFO queues are stored in a set of registers 605. The GB and BE flow queues 502 and 505 are implemented as FIFO queues of data packets.

A brief overview of the operation of the scheduler 602 is as follows. The packet receiver 600 receives the packets of GB data packet flows gb1-gbV and BE data packet flows be1-beU arriving from input links 201-1 through 201-r. Receiver 600 uses the contents of a flow-identification field contained in the header of each incoming packet (not shown) to identify the data packet flow of the packet. The identified flow can be either a GB flow or a BE flow. Therefore, the flow identification determines if the incoming packet should be stored in one of the GB flow queues 502 or in one of the BE flow queues 505. The scheduler uses the contents of the GB per-flow state table 503, of the BE per-flow state table 506, of the global state table 507, and of the BE-aggregate state table 508, to determine the lengths of the first subframe 407 and second subframe 408 in each service frame 406. For example, if the GB flows that are currently backlogged have a cumulative bandwidth allocation that is equal to 80% of the server capacity r, the scheduler 602 allots approximately 80% of the service frame to the first subframe and the remaining 20% to the second subframe. In this manner the scheduler enforces the bandwidth guarantees of all backlogged GB flows and distributes any unused portion of the server capacity, 20% in our example, to the BE flow aggregate. During the first subframe 407, the scheduler 602 services the backlogged GB flows from the head of the PWS FIFO queue 509 and transfers packets from their flow queues 502 to the transmitter 603. During the second subframe 408, the scheduler 602 services the backlogged BE flows from the head of the SWS FIFO queue 511 and sends packets from their flow queues 505 to the transmitter 603.

Detailed Operation

With joint reference to FIGS. 4–6, the following paragraphs discuss how the method of the present invention determines the amount of service to be granted to the BE flow aggregate 403 in the second subframe 408. The first subframe (or "GB subframe") 407 is devoted to satisfying the bandwidth requirements of the GB flows 402 that are backlogged at the beginning of the frame; in the second subframe (or "second subframe") 408, the WRR scheduler 602 serves the BE flow aggregate 403 until the expected frame duration 409 is reached (the expected frame duration is the duration of the WRR service frame when the whole capacity of the link is allocated to GB flows and all allocated GB flows are backlogged). The duration of both the first subframe 407 and the second subframe 408 is subject to fluctuations that are triggered by changes in the backlog state of the GB flows 402, whereas the actual overall frame duration 410 remains approximately constant as long as backlogged BE flows 405 are available (the overall duration of the service frame is only "approximately constant", and not "strictly constant", because of the variability in the amount of service that each backlogged flow can receive during a frame, as discussed above).

In order to determine the amount of service to be granted to the BE flow aggregate 403 within a service frame 406, the scheduler maintains a BE running share $\phi_{BE}$ that tracks the difference between the link capacity r and the sum of the service shares of the backlogged GB flows:

$$\phi_{BE}(t) = r - \sum_{i \in B_{GB}(t)} \rho_i \forall t \quad (5)$$

where $B_{GB}(t)$ is the set of GB flows that are backlogged at time t. (The definition of $\phi_{BE}$ in eq. (5) assumes that the sum of the service shares allocated to the GB flows does not exceed the capacity of the server.)

The scheduler 602 samples the BE running share $\phi_{BE}$ at the end of each GB subframe 407 (which is detected when no backlogged GB flow expects further service in the current frame), and uses its value to set a BE cumulative share $\Phi_{BE}$ for the incoming BE subframe 408. The scheduler 602 also maintains a BE timestamp $F_{BE}$ to regulate the duration of the BE subframe 408. Consistently with the SRR algorithm, at the end of the transmission of a BE packet of size $l_{BE}^k$ the scheduler updates the timestamp of the BE flow aggregate as follows:

$$F_{BE}^k = F_{BE}^{k-1} + \frac{l_{BE}^k}{\Phi_{BE}} \quad (6)$$

The distribution of service to the BE flow aggregate continues as long as backlogged BE flows are available and the BE timestamp does not exceed the reference timestamp increment $T_Q^{PWS}$. The violation of any of the two conditions triggers the end of both the BE subframe and the whole frame, and resumes the distribution of service to the GB flows 402 in a new frame.

During the BE subframe 408, the scheduler must still determine which individual BE flows to serve. The fairness criterion that requires equal amounts of service for BE flows that are simultaneously backlogged leads to the adoption of a separate instance of a WRR scheduler (i.e., the SWS 404) as the mechanism for handling the BE flows. In the SWS 404, all BE flows 405 are assigned the same service share ρ, as shown in FIG. 4. The service shares ρ of the BE flows do not count against the capacity of the server, so that there is no bandwidth constraint on the number of BE flows that can be allocated in the system. The frame dynamics of the SWS are completely independent of their counterparts in the PWS: multiple BE subframes 408 may be needed to complete a frame in the SWS, or, conversely, a single BE subframe 408 in the PWS may be sufficient to complete several frames in the SWS. Also, the PWS and SWS can adopt different values for their reference timestamp increments ($T_Q^{PWS}$ and $T_Q^{SWS}$, respectively).

The BE running share $\phi$BE is incremented every time a GB flow becomes idle, and decremented every time a GB flow becomes backlogged. The amount that is added (subtracted) to the BE running share $\phi_{BE}$ in the first (second) case is equal to the allocated service share of the GB flow.

If the PWS is implemented as a single FIFO queue of backlogged GB flows, the detection of the expected duration of the GB subframe relies on the comparison of two single-bit flags: a frame flag $FF_i$ associated with each flow i and a global frame counter GFC. The frame flag and the global frame counter work as follows. When a GB flow i becomes backlogged, it is appended to the tail of the queue of backlogged GB flows (i.e., the PWS FIFO queue 509), and its frame flag $FF_i$ is set to the complement of GFC:

$$FF_i = \neg GFC \quad (7)$$

When the server completes its visit to flow i for the current frame, it extracts the flow from the head of the PWS FIFO queue 509. Then, if the GB flow is still backlogged, the server appends the flow to the tail of the PWS FIFO queue 509 and toggles its frame flag:

$$FF_i = \neg FF_i \quad (8)$$

The GB subframe is over when the frame flag of the flow at the head of the PWS FIFO queue 509 is different than GFC. When the server detects this condition, it toggles the value of GFC and copies the BE running share $\phi_{BE}$ into the BE cumulative share $\Phi_{BE}$. The PWS 401 serves the BE aggregate as long as the BE cumulative share $\Phi_{BE}$ is greater than zero. Every PWS service to the BE aggregate translates into an SWS service to a BE flow. Two events can trigger a reset of the BE cumulative share $\Phi_{BE}$ and therefore the end of the BE subframe: the last backlogged BE flow becomes idle, or the BE timestamp $F_{BE}$ exceeds the PWS reference timestamp increment $T_Q^{PWS}$.

FIGS. 7A–7E depict in flow-chart form a method for scheduling the transmission of packets according to the present invention. The flow chart is based on the assumption that SRR is the underlying scheduling algorithm. As far as functionality is concerned, there is no problem in using DRR instead of SRR. Similarly, the apparatus of FIG. 4 implements the PWS 401 and the SWS 404 using a single FIFO queue of backlogged flows for each of them (PWS FIFO queue 509 and SWS FIFO queue 511, respectively). Any other queueing structure that allows a clear separation of in-frame and out-of-frame flows could be used as well. Finally, the adoption of a WRR scheduler for handling the BE flows allows the enforcement of service fairness over the BE flows, but is not strictly required to achieve the efficient integration of GB and BE flows. Any other scheduling mechanism could be used as well to handle the BE flows in isolation from the GB flows.

The following description makes reference to FIGS. 4, 5, 6, and 7A–E. The reference numbers to elements that are first defined in FIG. 4 (5, 6) begin with a 4 (5, 6), while the steps of the flow chart of FIGS. 7A–E are indicated by an S preceding the step number, e.g., S310.

In FIG. 7A, the scheduler 602 checks if there are newly received data packets in S310. If there are no newly received data packets in S310, and there are backlogged flows in S315, control passes to S500. If, instead, there are no newly received data packets in S310 and there are no backlogged flows in S315, then the scheduler 602 cycles between steps S310 and S315 until there are new packets received. When the presence of newly received packets is detected at receiver 600 in S310, the scheduler 602 selects one of the packets in S320. Then, the scheduler 602 identifies the flow of the data packet in S330, and finally stores the packet in the appropriate flow queue (either a GB flow queue 502 or a BE flow queue 505, depending on the identified flow). If the length of the flow queue is not zero in S350, the queue length for that flow is incremented in S355 and control passes to S500. If the queue length for the flow is zero in S350, the scheduler 602 increments the number of backlogged flows in S360 and the length of the flow queue in S370 (as an example, the length of the flow queue can measure the number of data packets in the queue; however, other units may also be used to express the length of a flow queue, such as bytes, bits, or memory words). Then, the scheduler 602 checks in S380 if the identified flow is a GB flow. If the identified flow is a GB flow $gb_i$, in S390 the scheduler 602 sets the frame flag $FF_{gb1}$ equal to ¬GFC. Then, the scheduler 602 decrements in S400 the BE running share $\phi_{BE}$, appends in S410 the flow $gb_i$ to the tail of the PWS FIFO queue 509, and finally passes control to S500.

If the flow identified in S330 is not recognized as a GB flow in S380, the scheduler 602 first appends the flow to the tail of the SWS FIFO queue 511 (in S420), and then checks if the number of backlogged flows equals 1 (in S430). If the number of backlogged flows equals 1 in S430, the scheduler 602 sets the BE cumulative share $\Phi_{BE}$ equal to the BE running share $\phi_{BE}$ in S440, and then passes control to S500. If, in S430, the number of backlogged flows does not equal 1, the scheduler passes control directly to S500.

In S500, if the transmitter 601 is still busy in the transmission of an old packet and cannot accept a new packet for transmission, the scheduler 602 returns to S310. Otherwise, if the transmitter 601 is not busy in the transmission of an old packet, the scheduler 602 checks in S510 if there is a previously serviced flow whose state still has to be updated. If such a flow does not exist, meaning that the scheduler 602 has already updated the state of the last serviced flow, the scheduler 602 determines in S520 if there is any backlogged flow. If no backlogged flow exists, the control of the scheduler 602 returns to S310; otherwise, if the presence of backlogged flows is detected in S520, the scheduler 602 checks in S530 the current value of the BE cumulative share $\Phi_{BE}$, stored in the BE flow-aggregate state table 508. If the value of the BE cumulative share $\Phi_{BE}$ is zero, the scheduler 602 moves to S540, where it selects for service the GB flow 402 at the head of the PWS FIFO queue 509. Then, in S560, the scheduler 602 sends the packet at the head of the flow queue 502 of the selected GB flow 402 to the transmitter 601. The control then returns to S310. If, in step S530, the value of the BE cumulative share $\Phi_{BE}$ is greater than zero, the scheduler 602 moves to S550, where it selects for service the BE flow 405 that is currently at the head of the SWS FIFO queue 511. Then, in S560, the scheduler 602 sends the packet at the head of the flow queue 505 of the selected BE flow 405 to the transmitter 601. The control then returns to S310.

If, in S510, the scheduler 602 determines that the state of the last serviced flow has still to be updated, it starts with the decrement of the queue length of the last serviced flow in S570. The scheduler 602 then proceeds with the update of the flow timestamp in S580. In S590, the scheduler 602 checks if the last serviced flow is a GB flow. If the last serviced flow is a GB flow $gb_i$, the scheduler 602 checks in S600 if the queue length of the flow is now equal to zero. If the queue length is not equal to zero, the scheduler checks in S610 if the updated timestamp of the GB flow $gb_i$, is greater than or equal to the PWS reference timestamp increment $T_Q^{PWS}$. If the updated timestamp is smaller than $T_Q^{PWS}$, the scheduler 602 moves to S710. If instead, the updated timestamp is not smaller than $T_Q^{PWS}$, the scheduler 602 first toggles the frame flag $FF_i$ of the last serviced GB flow $gb_i$, then it resets the timestamp within the valid range $[0, T_Q^{PWS})$ in S630, it extracts the pointer to the GB flow $gb_i$, from the head of the PWS FIFO queue 509 in S640, and finally appends the same flow pointer back to the tail of the PWS FIFO queue 509 in S650. Control then passes to S710.

If, in S600, the queue length for the GB flow $gb_i$ is equal to zero, the scheduler 602 checks in S660 if the timestamp of the flow is equal to or greater than $T_Q^{PWS}$. If the timestamp is smaller than $T_Q^{PWS}$, control passes to S680; otherwise, the scheduler resets the timestamp within the valid range in S670 and then proceeds to S680. In S680 the scheduler 602 extracts the last serviced flow from the head of the PWS FIFO queue 509; then, in S690, it increments the BE running share $\phi_{BE}$. The scheduler 602 decrements the number of backlogged flows in S700, and then moves to S710.

In S710 the scheduler 602 compares the frame flag of the GB flow $gb_j$ that is now at the head of the PWS FIFO queue 509 with the global frame counter GFC. If the frame flag and the GFC have the same value, the scheduler 602 passes control to S520, otherwise it toggles the value of the GFC in S720 and checks in S730 if there is any backlogged flow in the SWS FIFO queue 511. If there is at least one backlogged flow in the SWS FIFO queue 511, the scheduler 602 sets in S740 the BE cumulative share $\Phi_{BE}$ equal to the BE running share $\phi_{BE}$ and then passes control to S520. If there are no backlogged flows detected in S730, the scheduler 602 passes control directly to S520.

If, in S590, the last serviced flow is classified as a BE flow $be_i$, the scheduler 602 checks in S750 if the queue length for the BE flow $be_i$, is equal to zero. If the queue length is not equal to zero, meaning that there are packets left in the flow queue 505 of the last serviced BE flow $be_i$, the scheduler checks if the just updated timestamp of the last serviced BE flow $be_i$ is greater than or equal to the reference timestamp increment $T_Q^{SWS}$ of the SWS FIFO queue 511. If the updated timestamp is smaller than $T_Q^{SWS}$, the scheduler 602 moves to S840. If, instead, the updated timestamp is not smaller than $T_Q^{SWS}$, the scheduler 602 first resets the timestamp within the valid range $[0,T_Q^{SWS})$ in S770, then it extracts in S780 the pointer to the BE flow $be_i$ from the head of the SWS FIFO queue 511, and finally appends in S790 the same flow pointer back to the tail of the SWS FIFO queue 511. The scheduler 602 then passes control to S840.

If, in S750, the queue length for the BE flow $be_i$ is equal to zero, the scheduler 602 checks in S800 if the timestamp of the flow is equal to or greater than $T_Q^{SWS}$. If the timestamp is smaller than $T_Q^{SWS}$, control passes to S820; otherwise, the scheduler 602 resets the timestamp within the valid range in S810 and then proceeds to S820. In S820 the scheduler 602 extracts the last serviced flow $be_i$ from the head of the SWS FIFO queue 511. The scheduler 602 decrements the number of backlogged flows in S830, and then moves to S840.

In S840 the scheduler 602 updates the timestamp $F_{BE}$ of the BE flow aggregate. Then, in S850, it compares the updated timestamp of the BE flow aggregate with the PWS reference timestamp increment $T_Q^{PWS}$. If the timestamp $F_{BE}$ is greater than or equal to the reference timestamp increment $T_Q^{PWS}$, then the scheduler resets the timestamp within the valid range $[0, T_Q^{PWS})$ in S860, and then moves to S870, where it resets to zero the BE cumulative share $\Phi_{BE}$ of the BE flow aggregate. The scheduler 602 then passes control to S520. If, in S850, the timestamp of the BE flow aggregate is determined to be smaller than the PWS reference timestamp increment, the scheduler 602 moves to S880, where it checks for the presence of backlogged flows in the SWS FIFO queue 511. If no backlogged flows are left in the SWS FIFO queue 511, the scheduler 602 passes control to S870; otherwise it moves to S520.

The illustrative embodiments described above are but exemplary of the principles that may be used to integrate guaranteed-bandwidth and best-effort flows in a weighted round robin scheduler in accordance with the present invention. Those skilled in the art will be able to devise numerous arrangements which, although not explicitly shown or described herein, nevertheless embody those principles that are within the spirit and scope of the present invention as defined by the claims appended hereto.

What is claimed is:

1. A scheduling apparatus for servicing a plurality of data packet flows, each of said data packet flows having specified service requirements and being associated with respective one of a plurality of queues, each of said plurality of queues containing data packets, the distribution of service to said data packet flows being organized in service frames, each service frame offering a number of service opportunities to each of said data packet flows, said number of service opportunities depending on the service requirements of said data packet flows, the scheduling apparatus comprising:

a first scheduler providing service to each of a first set of guaranteed-bandwidth (GB) data packet flows that are backlogged during a first subframe of a service frame, said backlogged GB data packet flows having service requirements expressed in terms of guaranteed-bandwidth requirements, the service provided to each backlogged GB data packet flow being limited to its guaranteed bandwidth requirement even when the backlog at that backlogged GB data packet flow exceeds its guaranteed bandwidth, the duration of the first subframe being sufficient to satisfy the sum of the guaranteed bandwidth requirements of said first set of backlogged GB data packet flows, the duration of the first subframe being never longer than the duration of the service frame; and a second scheduler providing service to a second set of best-effort (BE) data packet flows during a second subframe of the service frame, said BE data packet flows having service requirements that are not expressed in terms of guaranteed bandwidth requirements, the duration of the second subframe being the duration of the service frame minus the duration of the first subframe in the same service frame.

2. The scheduling apparatus of claim 1, wherein the second scheduler equally allocates service to each data packet flow in said second set of BE data packet flows.

3. The scheduling apparatus of claim 1, wherein the first scheduler is a Weighted Round Robin (WRR) scheduler.

4. The scheduling apparatus of claim 3, wherein the second scheduler is a WRR scheduler.

5. The scheduling apparatus of claim 1, wherein the duration of the service frame is determined to accommodate the sum of the guaranteed bandwidth requirements of the GB data packet flows in the case where said sum of the guaranteed bandwidth requirements is equal to a fixed service rate.

6. The scheduling apparatus of claim 1, wherein the duration of the service frame is fixed.

7. The scheduling apparatus of claim 1, wherein the duration of the first subframe is fixed.

8. The scheduling apparatus of claim 1, wherein the duration of the service frame is variable.

9. The scheduling apparatus of claim 1, wherein the duration of the first subframe is variable.

10. The scheduling apparatus of claim 1, wherein the end of the second subframe is determined when either (1) a predetermined duration of the service frame expires, or (2) there is no remaining backlog in said second set of BE flows, whichever condition occurs first, a backlog in a set of flows being defined as the presence of one or a plurality of data packets in one or a plurality of queues associated with the set of data packet flows being considered.

11. The scheduling apparatus of claim 1, wherein said first scheduler maintains a timestamp $F_{BE}$ for an aggregate of BE data packet flows in order to regulate the duration of said second subframe.

12. The scheduling apparatus of claim 11, wherein the data packet flows that are backlogged in said second set of BE data packet flows are sorted for service in a Secondary WRR Scheduler (SWS) FIFO queue of data flow items.

13. The scheduling apparatus of claim 1, wherein:
the data packet flows that are backlogged in said first set of GB flows are sorted for service in a Primary WRR Scheduler (PWS) First-In-First-Out (FIFO) queue of data flow items;
each data packet flow of said first set of GB flows has a frame flag associated therewith; and
said first subframe is over when the frame flag of the GB flow at the head of said PWS FIFO queue has different value than a global frame counter GFC.

14. The scheduling apparatus of claim 13, wherein the value of said GFC is set equal to the value of said frame flag of said GB flow at the head of said PWS FIFO queue after a difference between the two values is detected.

15. The scheduling apparatus of claim 13, wherein the end of said second subframe is declared every time a timestamp $F_{BE}$ of an aggregate of BE data packet flows exceeds a PWS reference timestamp increment $T_Q^{PWS}$.

16. A scheduling apparatus for servicing a plurality of data packet flows, each of said data packet flows having specified service requirements and being associated with respective one of a plurality of queues, each of said plurality of queues containing data packets, the distribution of service to said data packet flows being organized in service frames, each service frame offering a number of service opportunities to each of said data packet flows, said number of service opportunities depending on the service requirements of said data packet flows, the scheduling apparatus comprising:

a first scheduler providing service to a first set of guaranteed-bandwidth (GB) data packet flows during a first subframe of a service frame, said GB data packet flows having service requirements expressed in terms of bandwidth requirements, the duration of the first subframe being adjusted to satisfy the bandwidth requirements of said GB data packet flows;

a second scheduler providing service to a second set of best-effort (BE) data packet flows during a second subframe of the service frame, said BE data packet flows having service requirements that are not expressed in terms of guaranteed bandwidth requirements, the duration of the second subframe being the duration of the service frame minus the duration of the first subframe in the same service frame; and wherein the duration of said second subframe is derived from a BE running share $\phi_{BE}$, which is defined as the difference between a fixed service rate and the sum of the guaranteed bandwidth requirements of each of the GB flows that have a backlog in respective ones of said plurality of queues.

17. The scheduling apparatus of claim 16, wherein the BE running share $\phi_{BE}$ receives an increment every time a GB flow becomes idle and a decrement every time a GB flow becomes backlogged.

18. The scheduling apparatus of claim 17, wherein said increment and decrement are related to the guaranteed bandwidth requirement of the GB data packet flow that becomes idle and backlogged, respectively.

19. The scheduling apparatus of claim 16, wherein a BE cumulative share $\Phi_{BE}$ is set equal to said $\phi_{BE}$ running share BE at the end of the first subframe, and equal to zero at the end of the service frame.

20. The scheduling apparatus of claim 19, wherein the selection of the second scheduler has strict priority over the selection of the first scheduler if the cumulative share $\Phi_{BE}$ is not equal to zero.

21. A method of operating a scheduler for servicing a plurality of data packet flows, each of said data packet flows having specified service requirements and being associated with one of a plurality of queues, each of said plurality of queues containing data packets, the distribution of service to said data packet flows being organized in service frames, each service frame offering a number of service opportunities to each of said data packet flows, said number of service opportunities depending on the service requirements of said data packet flows, the method comprising the steps of:

providing service to each of a first set of guaranteed-bandwidth (GB) data packet flows that are backlogged during a first subframe of a service frame, said backlogged GB data packet flows having service requirements expressed in terms of guaranteed-bandwidth requirements, the service provided to each backlogged GB data packet flow being limited to its guaranteed bandwidth requirement even when the backlog at that backlogged GB data packet flow exceeds its guaranteed bandwidth, the duration of the first subframe being sufficient to satisfy the sum of the guaranteed bandwidth requirements of said GB data packet flows, the duration of the first subframe being never longer than the duration of the service frame; and providing service to a second set of best-effort (BE) flows during a second subframe of the service frame, said BE data packet flows having service requirements that are not expressed in terms of guaranteed bandwidth requirements, the duration of the second subframe being the duration of the service frame minus the duration of the first subframe in the same service frame.

* * * * *